(12) United States Patent
Brock et al.

(10) Patent No.: US 10,332,162 B1
(45) Date of Patent: Jun. 25, 2019

(54) USING WIRELESS BEACONS FOR TRANSIT SYSTEMS

(71) Applicant: Square, Inc., San Francisco, CA (US)

(72) Inventors: Zachary Brock, San Francisco, CA (US); Randolf Farish Reddig, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 1332 days.

(21) Appl. No.: 14/042,366

(22) Filed: Sep. 30, 2013

(51) Int. Cl.
*G06Q 30/02* (2012.01)
(52) U.S. Cl.
CPC .............................. *G06Q 30/0284* (2013.01)
(58) Field of Classification Search
CPC .... G06Q 10/02; G06Q 30/0284; G06Q 50/30; G08G 1/123
USPC ......................................... 705/13; 455/456.3
See application file for complete search history.

(56) References Cited

U.S. PATENT DOCUMENTS

| | | | |
|---|---|---|---|
| 4,254,441 A | 3/1981 | Fisher | |
| 6,374,176 B1 * | 4/2002 | Schmier | G08G 1/123 340/988 |
| 6,476,743 B1 | 11/2002 | Brown et al. | |
| 6,526,275 B1 | 2/2003 | Calvert | |
| 6,612,488 B2 | 9/2003 | Suzuki | |
| 6,659,344 B2 | 12/2003 | Otto et al. | |
| 6,820,062 B1 | 11/2004 | Gupta et al. | |
| 6,832,721 B2 | 12/2004 | Fujii | |
| 6,868,391 B1 | 3/2005 | Hultgren | |

(Continued)

FOREIGN PATENT DOCUMENTS

| | | |
|---|---|---|
| AU | 2017208387 A1 | 8/2017 |
| CA | 2 919 238 A1 | 1/2015 |

(Continued)

OTHER PUBLICATIONS

Finzgar et. al.; "Use of NFC and QR code identification in an electronic ticket system for public transport"; Published in SoftCOM 2011, 19th International Conference on Software, Telecommunications and Computer networks; Published Nov. 1, 2011 (Year: 2011).*

(Continued)

*Primary Examiner* — Kevin H Flynn
*Assistant Examiner* — Emmett K. Walsh
(74) *Attorney, Agent, or Firm* — Polsinelli PC—Square

(57) ABSTRACT

Methods, systems, and apparatus, including computer programs encoded on computer storage media, for processing transit system fares using wireless beacons. One of the methods includes determining, at a receiver device on a passenger transport vehicle, presence of a user device on board the passenger transport vehicle based on a wireless signal emitted by the user device. A user identifier is determined based on the signal emitted by the user device. Ride information associated with the user is determined based at least in part on the determination of presence of the user and based at least in part on determining that the exit criterion is satisfied. The user identifier and the ride information is provided to a payment service system, wherein the payment service system determines a fare based on the ride information and initiates a payment transaction for the fare using a user account identified by the user identifier.

18 Claims, 5 Drawing Sheets

(56) References Cited

U.S. PATENT DOCUMENTS

| | | | |
|---|---|---|---|
| 6,888,443 B2* | 5/2005 | Ritter | H04H 20/62 340/5.64 |
| 7,207,480 B1 | 4/2007 | Geddes | |
| 7,309,012 B2 | 12/2007 | von Mueller et al. | |
| 7,376,431 B2 | 5/2008 | Niedermeyer | |
| 7,376,583 B1 | 5/2008 | Rolf | |
| 7,403,762 B2 | 7/2008 | Morgan et al. | |
| 7,620,404 B2 | 11/2009 | Chesnais et al. | |
| 7,684,809 B2 | 3/2010 | Niedermeyer | |
| 7,945,494 B2 | 5/2011 | Williams | |
| 8,050,984 B2 | 11/2011 | Bonner et al. | |
| 8,438,066 B1 | 5/2013 | Yuen et al. | |
| 8,684,261 B2 | 4/2014 | Burdett et al. | |
| 8,766,791 B2 | 7/2014 | Koen et al. | |
| 9,055,400 B1 | 6/2015 | Lee | |
| 9,113,344 B1 | 8/2015 | Lee | |
| 9,204,257 B1 | 12/2015 | Mendelson | |
| 9,264,850 B1 | 2/2016 | Lee | |
| 9,373,112 B1 | 6/2016 | Henderson et al. | |
| 9,451,397 B1 | 9/2016 | Lee | |
| 9,730,015 B1 | 8/2017 | Lee | |
| 9,838,840 B1 | 12/2017 | Lee | |
| 9,924,322 B2 | 3/2018 | Post et al. | |
| 2001/0001856 A1 | 5/2001 | Gould et al. | |
| 2002/0049644 A1 | 4/2002 | Kargman | |
| 2002/0077974 A1 | 6/2002 | Ortiz | |
| 2002/0099648 A1 | 7/2002 | DeVoe et al. | |
| 2002/0108062 A1 | 8/2002 | Nakajima et al. | |
| 2002/0169541 A1 | 11/2002 | Bouve et al. | |
| 2002/0198818 A1 | 12/2002 | Scott et al. | |
| 2003/0004842 A1 | 1/2003 | Williams et al. | |
| 2003/0135463 A1 | 7/2003 | Brown et al. | |
| 2004/0002897 A1 | 1/2004 | Vishik | |
| 2004/0015475 A1* | 1/2004 | Scheepsma | G07B 15/02 |
| 2004/0049451 A1 | 3/2004 | Berardi et al. | |
| 2004/0064378 A1 | 4/2004 | Yoshida | |
| 2004/0093274 A1 | 5/2004 | Vanska et al. | |
| 2005/0004757 A1* | 1/2005 | Neeman | G01C 21/3423 701/414 |
| 2005/0048961 A1 | 3/2005 | Ribaudo et al. | |
| 2005/0159133 A1 | 7/2005 | Hasan et al. | |
| 2005/0242173 A1 | 11/2005 | Suzuki | |
| 2005/0251440 A1 | 11/2005 | Bednarek | |
| 2005/0256782 A1 | 11/2005 | Sands et al. | |
| 2005/0266798 A1 | 12/2005 | Moloney et al. | |
| 2006/0200378 A1 | 9/2006 | Sorensen | |
| 2006/0293968 A1 | 12/2006 | Brice | |
| 2007/0030824 A1 | 2/2007 | Ribaudo et al. | |
| 2007/0072678 A1 | 3/2007 | Dagres | |
| 2007/0118429 A1 | 5/2007 | Subotovsky | |
| 2007/0124211 A1 | 5/2007 | Smith | |
| 2007/0138268 A1 | 6/2007 | Tuchman | |
| 2007/0150369 A1 | 6/2007 | Zivin | |
| 2007/0150414 A1 | 6/2007 | Templeton | |
| 2007/0244778 A1 | 10/2007 | Bailard | |
| 2007/0282700 A1 | 12/2007 | Masse | |
| 2007/0299722 A1* | 12/2007 | Stoffelsma | G06Q 10/02 705/13 |
| 2008/0040219 A1 | 2/2008 | Kim et al. | |
| 2008/0054072 A1* | 3/2008 | Katragadda | G08G 1/123 235/384 |
| 2008/0059297 A1 | 3/2008 | Vallier et al. | |
| 2008/0059375 A1 | 3/2008 | Abifaker | |
| 2008/0061150 A1 | 3/2008 | Phillips | |
| 2008/0084977 A1 | 4/2008 | Nayak et al. | |
| 2008/0147507 A1 | 6/2008 | Langhammer | |
| 2008/0147564 A1 | 6/2008 | Singhal | |
| 2008/0189170 A1 | 8/2008 | Ramachandra et al. | |
| 2008/0195428 A1* | 8/2008 | O'Sullivan | G06Q 10/00 705/6 |
| 2008/0215380 A1* | 9/2008 | Graeber | G06Q 10/02 705/5 |
| 2008/0242278 A1 | 10/2008 | Rekimoto | |
| 2008/0249865 A1 | 10/2008 | Angell et al. | |
| 2008/0249939 A1 | 10/2008 | Veenstra | |
| 2008/0277183 A1* | 11/2008 | Huang | B60R 25/00 180/271 |
| 2008/0306678 A1* | 12/2008 | Miyawaki | G08G 1/127 701/118 |
| 2009/0043696 A1 | 2/2009 | Ornce et al. | |
| 2009/0100168 A1 | 4/2009 | Harris | |
| 2009/0166422 A1 | 7/2009 | Biskupski | |
| 2009/0210334 A1 | 8/2009 | Russell | |
| 2009/0216676 A1 | 8/2009 | Mathur et al. | |
| 2009/0287408 A1* | 11/2009 | Gerdes | G01C 21/3423 701/533 |
| 2009/0298514 A1 | 12/2009 | Ullah | |
| 2010/0087144 A1 | 4/2010 | Korenshtein | |
| 2010/0125495 A1 | 5/2010 | Smith et al. | |
| 2010/0135178 A1 | 6/2010 | Aggarwal et al. | |
| 2010/0144375 A1* | 6/2010 | Pfister | G07B 15/02 455/456.5 |
| 2010/0145868 A1 | 6/2010 | Niedermeyer | |
| 2010/0197325 A1* | 8/2010 | Dredge | H04L 67/18 455/456.3 |
| 2010/0287250 A1 | 11/2010 | Carlson et al. | |
| 2010/0306080 A1 | 12/2010 | Trandal et al. | |
| 2010/0328029 A1 | 12/2010 | Kolek | |
| 2011/0045840 A1 | 2/2011 | Alizadeh-Shabdiz et al. | |
| 2011/0047037 A1* | 2/2011 | Wu | G06Q 20/204 705/17 |
| 2011/0060600 A1* | 3/2011 | Fox | G01S 19/51 705/1.1 |
| 2011/0063138 A1 | 3/2011 | Berkobin et al. | |
| 2011/0090124 A1 | 4/2011 | Liu et al. | |
| 2011/0137773 A1* | 6/2011 | Davis, III | G01G 19/4142 705/34 |
| 2011/0153495 A1* | 6/2011 | Dixon | G06Q 20/10 705/39 |
| 2011/0180601 A1 | 7/2011 | Morley | |
| 2011/0202393 A1* | 8/2011 | DeWakar | G06Q 20/102 705/13 |
| 2011/0208612 A1 | 8/2011 | Shader et al. | |
| 2011/0213652 A1 | 9/2011 | Gillen et al. | |
| 2011/0238476 A1 | 9/2011 | Carr et al. | |
| 2011/0238517 A1 | 9/2011 | Ramalingam et al. | |
| 2011/0249668 A1 | 10/2011 | Van Milligan et al. | |
| 2012/0005096 A1 | 1/2012 | Dorsey et al. | |
| 2012/0052874 A1 | 3/2012 | Kumar | |
| 2012/0101942 A1* | 4/2012 | Park | G06Q 20/0457 705/40 |
| 2012/0109781 A1 | 5/2012 | Felt et al. | |
| 2012/0115512 A1 | 5/2012 | Grainger et al. | |
| 2012/0116861 A1 | 5/2012 | Dobyns | |
| 2012/0128089 A1 | 5/2012 | Tsutsui | |
| 2012/0130895 A1 | 5/2012 | Granbery et al. | |
| 2012/0149390 A1 | 6/2012 | Gravely et al. | |
| 2012/0158500 A1 | 6/2012 | Hochstatter et al. | |
| 2012/0166267 A1 | 6/2012 | Beatty et al. | |
| 2012/0195295 A1 | 8/2012 | Elmaleh | |
| 2012/0209686 A1* | 8/2012 | Horowitz | H04W 4/21 705/14.26 |
| 2012/0209773 A1 | 8/2012 | Ranganathan | |
| 2012/0235812 A1* | 9/2012 | Maia | G01S 13/08 340/539.13 |
| 2012/0252500 A1 | 10/2012 | Mitsuya et al. | |
| 2012/0278150 A1 | 11/2012 | Chen | |
| 2012/0278172 A1 | 11/2012 | Mercuri et al. | |
| 2012/0296724 A1 | 11/2012 | Faro et al. | |
| 2012/0303425 A1 | 11/2012 | Katzin et al. | |
| 2013/0002840 A1 | 1/2013 | Toney et al. | |
| 2013/0024018 A1 | 1/2013 | Chang et al. | |
| 2013/0027227 A1 | 1/2013 | Nordstrom | |
| 2013/0030931 A1 | 1/2013 | Moshfeghi | |
| 2013/0054281 A1* | 2/2013 | Thakkar | G06Q 50/30 705/5 |
| 2013/0079037 A1 | 3/2013 | Dobyns | |
| 2013/0110659 A1 | 5/2013 | Phillips et al. | |
| 2013/0132274 A1 | 5/2013 | Henderson et al. | |
| 2013/0144715 A1 | 6/2013 | Kranzley et al. | |
| 2013/0157685 A1 | 6/2013 | Young | |

(56) References Cited

U.S. PATENT DOCUMENTS

| | | | | |
|---|---|---|---|---|
| 2013/0185123 | A1* | 7/2013 | Krivopaltsev | G06Q 50/30 705/13 |
| 2013/0191195 | A1 | 7/2013 | Carlson et al. | |
| 2013/0217332 | A1 | 8/2013 | Altman et al. | |
| 2013/0217333 | A1 | 8/2013 | Sprigg et al. | |
| 2013/0238540 | A1* | 9/2013 | O'Donoghue | G06Q 99/00 706/46 |
| 2013/0282438 | A1 | 10/2013 | Hunter et al. | |
| 2013/0297422 | A1 | 11/2013 | Hunter et al. | |
| 2013/0304898 | A1 | 11/2013 | Aggarwal et al. | |
| 2014/0028440 | A1* | 1/2014 | Takeuchi | G05B 1/01 340/5.61 |
| 2014/0052615 | A1 | 2/2014 | Andersen | |
| 2014/0068719 | A1 | 3/2014 | Kiukkonen et al. | |
| 2014/0123043 | A1 | 5/2014 | Schmidt et al. | |
| 2014/0149282 | A1 | 5/2014 | Philliou et al. | |
| 2014/0370879 | A1 | 12/2014 | Redding et al. | |
| 2015/0031388 | A1 | 1/2015 | Chatterjee et al. | |
| 2015/0079942 | A1 | 3/2015 | Kostka et al. | |
| 2015/0126119 | A1 | 5/2015 | Schulz et al. | |
| 2015/0178698 | A1* | 6/2015 | Schulz | G06Q 20/145 705/13 |
| 2016/0019531 | A1 | 1/2016 | Gormley | |
| 2016/0210606 | A1 | 7/2016 | Henderson et al. | |
| 2016/0259616 | A1 | 9/2016 | Hosein et al. | |
| 2018/0227712 | A1 | 8/2018 | Post et al. | |

FOREIGN PATENT DOCUMENTS

| | | | |
|---|---|---|---|
| EP | 2 506 642 | A1 | 10/2012 |
| WO | 2013/009891 | A1 | 1/2013 |
| WO | 2015/013170 | A1 | 1/2015 |

OTHER PUBLICATIONS

Non-Final Office Action dated Aug. 7, 2009, for U.S. Appl. No. 12/050,752, of Niedermeyer, B.J., filed Mar. 18, 2008.
Notice of Allowance dated Dec. 16, 2009, for U.S. Appl. No. 12/050,752, of Niedermeyer, B.J., filed Mar. 18, 2008.
Non-Final Office Action dated Sep. 10, 2010, for U.S. Appl. No. 12/707,228, of Niedermeyer, B.J., filed Feb. 17, 2010.
Final Office Action dated Mar. 31, 2011, for U.S. Appl. No. 12/707,228, of Niedermeyer, B.J., filed Feb. 17, 2010.
Non-Final Office Action dated Oct. 10, 2012, for U.S. Appl. No. 13/179,832, of Dorsey, J., et al., filed Jul. 11, 2011.
Final Office Action dated Jun. 27, 2013, for U.S. Appl. No. 13/179,832, of Dorsey, J., et al., filed Jul. 11, 2011.
Advisory Action dated Oct. 24, 2013, for U.S. Appl. No. 13/179,832, of Dorsey, J., et al., filed Jul. 11, 2011.
Non-Final Office Action dated Jan. 8, 2014, for U.S. Appl. No. 13/179,832, of Dorsey, J., et al., filed Jul. 11, 2011.
Non Final Office Action dated Dec. 1, 2014, for U.S. Appl. No. 13/802,064, of Lee, B., filed Mar. 13, 2013.
Notice of Allowance dated Feb. 6, 2015, for U.S. Appl. No. 13/802,290, of Lee, B., filed Mar. 13, 2013.
Final Office Action dated Mar. 20, 2015, for U.S. Appl. No. 13/802,064, of Lee, B., filed Mar. 13, 2013.
Notice of Allowance dated Apr. 13, 2015, for U.S. Appl. No. 13/801,340, of Lee, B., filed Mar. 13, 2013.
Non Final Office Action dated Oct. 1, 2015, for U.S. Appl. No. 14/803,850, of Lee, B., filed Jul. 20, 2015.
Notice of Allowance dated Oct. 13, 2015, for U.S. Appl. No. 13/802,064, of Lee, B., filed Mar. 13, 2013.
Non-Final Office action dated Oct. 19, 2015, for U.S. Appl. No. 13/948,871, of Post, J.D., et al., filed Jul. 23, 2013.
Non Final Office Action dated Jan. 13, 2016, for U.S. Appl. No. 14/726,165, of Lee, B., filed May 29, 2015.
Non-Final Office Action dated Mar. 10, 2016, for U.S. Appl. No. 14/065,760, of Henderson, W., et al., filed Oct. 29, 2013.
Notice of Allowance dated May 12, 2016, for U.S. Appl. No. 14/726,165, of Lee, B., filed May 29, 2015.
Final Office action dated May 17, 2016, for U.S. Appl. No. 13/948,871, of Post, J.D., et al., filed Jul. 23, 2013.
Final Office Action dated Jul. 6, 2016, for U.S. Appl. No. 14/065,760, of Henderson, W., et al., filed Oct. 29, 2013.
Final Office Action dated Jul. 22, 2016, for U.S. Appl. No. 14/803,850, of Lee, B., filed Jul. 20, 2015.
Non-Final Office Action dated Jul. 29, 2016, for U.S. Appl. No. 14/079,320, of Chatterjee, S., et al., filed Nov. 13, 2013.
Examination Report No. 1 for Australian Patent Application No. 2014293388, dated Aug. 2, 2016.
Advisory Action dated Sep. 1, 2016, for U.S. Appl. No. 13/948,871, of Post, J.D., et al., filed Jul. 23, 2013.
Non-Final Office action dated Dec. 16, 2016, for U.S. Appl. No. 13/948,871, of Post, J.D., et al., filed Jul. 23, 2013.
Examiner Requisition for Canadian Patent Application No. 2,919,238, dated Feb. 6, 2017.
Non Final Office Action dated Mar. 1, 2017, for U.S. Appl. No. 14/941,020, of Lee, B., filed Nov. 13, 2015.
Non-Final Office Action dated Apr. 4, 2017, for U.S. Appl. No. 15/269,865, of Lee, B., filed Sep. 19, 2016.
Non-Final Office Action dated Apr. 6, 2017, for U.S. Appl. No. 14/065,760, of Henderson, W., et al., filed Oct. 29, 2013.
Notice of Allowance dated Apr. 7, 2017, for U.S. Appl. No. 14/803,850, of Lee, B., filed Jul. 20, 2015.
Final Office Action dated Apr. 11, 2017, for U.S. Appl. No. 14/079,320, of Chatterjee, S., et al., filed Nov. 13, 2013.
Non-Final Office Action dated May 4, 2017, for U.S. Appl. No. 15/084,390, of Henderson, W., et al., filed Mar. 29, 2016.
Advisory Action dated Jul. 20, 2017, for U.S. Appl. No. 14/079,320, of Chatterjee, S., et al., filed Nov. 13, 2013.
Final Office action dated Jul. 20, 2017, for U.S. Appl. No. 13/948,871, of Post, J.D., et al., filed Jul. 23, 2013.
Notice of Allowance dated Jul. 25, 2017, for U.S. Appl. No. 15/269,865, of Lee, B., filed Sep. 19, 2016.
Final Office Action dated Sep. 27, 2017, for U.S. Appl. No. 14/941,020, of Lee, B., filed Nov. 13, 2015.
Advisory Action dated Oct. 5, 2017, for U.S. Appl. No. 13/948,871, of Post, J.D., et al., filed Jul. 23, 2013.
Non-Final Office Action dated Oct. 6, 2017, for U.S. Appl. No. 14/079,320, of Chatterjee, S., et al., filed Nov. 13, 2013.
Final Office Action dated Oct. 18, 2017, for U.S. Appl. No. 15/084,390, of Henderson, W., et al., filed Mar. 29, 2016.
Final Office Action dated Nov. 1, 2017, for U.S. Appl. No. 14/065,760, of Henderson, W., et al., filed Oct. 29, 2013.
Notice of Allowance dated Nov. 6, 2017, for U.S. Appl. No. 13/948,871, of Post, J.D., et al., filed Jul. 23, 2013.
Advisory Action dated Jan. 4, 2018, for U.S. Appl. No. 14/941,020, of Lee, B., filed Nov. 13, 2015.
Examiner Requisition for Canadian Patent Application No. 2,919,238, dated Feb. 9, 2018.
Final Office Action dated Feb. 22, 2018, for U.S. Appl. No. 14/079,320, of Chatterjee, S., et al., filed Nov. 13, 2013.
Examination Report No. 1 for Australian Patent Application No. 2017208387, dated Feb. 26, 2018.
Advisory Action dated Feb. 28, 2018, for U.S. Appl. No. 14/065,760, of Henderson, W., et al., filed Oct. 29, 2013.
Non-Final Office Action dated Mar. 22, 2018, for U.S. Appl. No. 14/941,020, of Lee, B., filed Nov. 13, 2015.
International Search Report and Written Opinion for International Application No. PCT/US2012/046282, dated Oct. 4, 2012.
International Search Report and Written Opinion for International Application No. PCT/US2014/047381 dated Nov. 25, 2014.
Burke, R.R., "The Third Wave of Marketing Intelligence," Retailing in the 21st Century: Current and Future Trends, pp. 103-115 (2010).
Chediak, M., "Retail technology; Grocers get taste of future; Store owners who want to stand out in the crowd these days are embracing cutting-edge services," The Orlando Sentinel, pp. 1-2 (Jan. 21, 2006).
Shekar, S., et al., "iGrocer—A Ubiquitous and Pervasive Smart Grocery Shopping System," Proceedings of the 2003 ACM Symposium on Applied Computing, pp. 645-652 (Mar. 9, 2003).

(56) References Cited

OTHER PUBLICATIONS

Non-Final Office Action dated May 16, 2018, for U.S. Appl. No. 15/084,390, of Henderson, W., et al., filed Mar. 29, 2016.
Non-Final Office Action dated Aug. 6, 2018, for U.S. Appl. No. 14/065,760, of Henderson, W., et al., filed Oct. 29, 2013.
Notice of Allowance dated Aug. 8, 2018, for U.S. Appl. No. 14/079,320, of Chatterjee, S., et al., filed Nov. 13, 2013.

\* cited by examiner

USING WIRELESS BEACONS FOR TRANSIT SYSTEMS

BACKGROUND

This specification relates to processing passenger information for transit systems.

Passengers can board vehicles of public transit systems, e.g., buses and trains, by using a variety of payment methods, including presenting tokens or cash, presenting purchased tickets, swiping a loaded fare card in a card reader, or tapping a near-field communications (NFC) or radio-frequency identification (RFID) tag at fixed gates. If the payment method is authorized, the system, or a transit official, authorizes the passenger to board the transit vehicle, for example, by allowing the passenger to pass through a turnstile or board a bus or train, as the case may be.

However, these methods of paying for transit are cumbersome and interfere with the boarding process. Long lines can form at ticket machines, turnstiles, and when boarding transit vehicles due to time that is spent processing payments from passengers and authorizing the passengers to board. Passengers must first acquire cash or tokens, or they must keep track of a separate transit card or multiple transit cards for multiple transit systems or cities. Preloaded fare cards can run out and can require manual reloading.

BRIEF DESCRIPTION OF THE DRAWINGS

Like reference numbers and designations in the various drawings indicate like elements.

DETAILED DESCRIPTION

Figure 1:
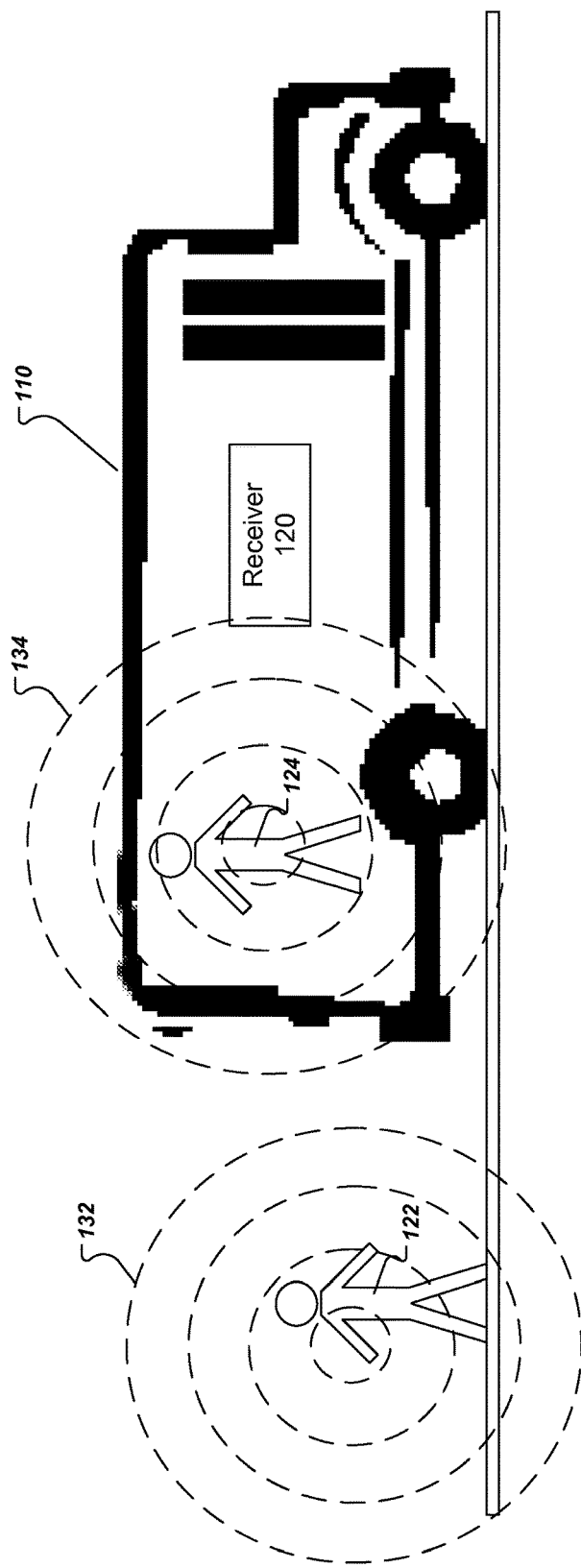
FIG. 1 is a diagram of a wireless beacon receiver device installed on a bus.

A system can use a wireless beacon to detect a user's presence on a passenger transport vehicle, e.g. a bus or a train, which can be used to determine the user's activity on a transit system. A user's transit activity can include ride information describing transit vehicles ridden by the user, origins and destinations of each ride, locations along each ride, and times that each ride occurred and times that the user arrived or departed each location. The system can then calculate fares for the user's transit activity and can, with the user's consent, use a payment service system to automatically process payment transactions for the fares owed by the user.

From the user's perspective, using a wireless beacon makes taking public transit a seamless experience in which paying for transit fares occurs automatically and in the background. In other words, using transit systems does not require the user's active engagement with transit card readers, turnstiles, or ticket machines. Rather, the user can rely on the wireless beacon to indicate the user's presence on the transit system and to signify the user's consent to have fares automatically processed by the payment service system. The user need only go to the station, board the transit vehicle, and deboard the vehicle. Meanwhile, the details of figuring out the trip length or stations visited, fare owed, and fare payment method are handled automatically.

From the transit system's perspective, using wireless beacons reduces lines for purchasing tickets and for boarding. Receiver devices that detect onboard users having wireless beacons and equipped with wireless communication capability can be placed on transport vehicles to replace bulky and expensive fixed gates and turnstiles installed in transit stations. The seamless user experience can result in increased ridership and fares collected.

The techniques described can be applied to any appropriate passenger transport vehicle as part of any appropriate transit system, for example, systems that include buses, trolley cars, trams, trains, subways, ferries, cable cars, or taxis, for example.

In this specification, a wireless beacon refers to a personal user device that continuously or repeatedly emits mid-range to short-range radio signals that can communicate information wirelessly to other devices. A wireless beacon can communicate information, e.g. a user identifier, to another device using an automatic pairing process, e.g., without the devices engaging in a pairing process that requires user input and without requiring explicit user authorization to communicate with another device. The wireless beacon can be part of a wristwatch, a mobile phone, a portable music player, a tablet computer, a laptop computer, a personal digital assistant, a smartphone, a keychain beacon, or another handheld or wearable mobile device. The radio signals emitted by the wireless beacon can be part of any appropriate standard for mid-range to short-range radio communications having an operable range of at least one meter and up to about 50 meters, e.g., Bluetooth, Bluetooth 4.0, and Bluetooth Low Energy (BLE). The radio signals described in this specification can be any appropriate type of signal, e.g., a broadcast signal that indicates presence of the device to nearby devices, a pairing signal that requests automatic pairing with a nearby device, or a connection signal that transmits data to a connected nearby device, to name a few examples.

For example, a user can install an application on a BLE-enabled smartphone. The application can cause the smartphone to emit BLE signals at regular intervals, e.g., every two seconds. The BLE signal can encode a user identifier of the user, which can be linked to or otherwise used to identify an account that the user has with a payment service system.

A public transit authority can install a receiver device in each passenger transport vehicle. For example, a receiver device can be installed in each bus of a fleet of buses. The receiver device can wait for incoming BLE signals that encode user identifiers. The receiver device can use the incoming BLE signals to determine when the user is on the bus and when the user is off the bus, e.g., by measuring a signal strength of the BLE signal.

The receiver device can generate geographic location information that records locations of the bus while the user was on board. When the user exits the bus, the receiver device can forward the geographic location information to a payment service system along with the user identifier received from the BLE signal. The payment service system can calculate a fare owed based on the geographic location information and use the user identifier to identify an account of the user, which will be used to process a payment transaction for the fare owed.

As another example, a user can enter a train station, skip the ticket lines, and go directly to boarding the train. Instead of fumbling with her possessions to find a transit card or searching for loose change, the user can instead rely on a small BLE beacon that the user keeps in her backpack. While riding the train, the user knows that she can exit the train system at any stop without thinking about whether a purchased fare card has been loaded with enough value. When she arrives at her location, she can exit the train station without looking for or digging out a fare card at an exit turnstile.

The train conductor need not interrupt the user to ask for proof of payment. Instead, the train conductor can rely on a BLE-enabled tablet as he walks through the train, which lists user identifiers and account profile pictures of nearby passengers, which can be obtained from the BLE signal emitted from the user's device. Thus, the train conductor need only ask for proof of payment from nearby passengers that do not appear on the tablet screen as he walks through the train, resulting in a speedier and more effortless task.

FIG. 1 is a diagram of a wireless beacon receiver device 120 installed on a bus 110. The receiver device 120 in FIG. 1 is an example application of using wireless beacons for transit systems. The receiver device 120 can receive wireless beacon signals to determine users who are on the bus 110 and locations to where they rode the bus 110. The receiver device 120 can be any appropriate computing device that can receive and decode wireless beacon signals and communicate wirelessly with a payment service system. For example, the receiver device 120 can be a smartphone, a tablet computer, a laptop or desktop computer, a dedicated onboard fare processing system, or other data processing apparatus.

The user 124 is on board the bus 110 and is in possession of a wireless beacon that emits a signal 134. The receiver device 120 receives the signal 134 and determines whether or not the user 124 is on board the bus. For example, the receiver device 120 can measure the strength of the signal emitted by the wireless beacon and compute a distance from the measured signal strength. If the distance satisfies a threshold, e.g., if the user is determined to be within 15 meters of the receiver device 120, the receiver can determine that the user is on board the bus 110.

On the other hand, the user 122 is not on board the bus 110 and is in possession of a wireless beacon that emits a signal 132. The receiver device 120 receives the signal 132 and determines that the user 122 is not on board the bus 110, e.g., by determining that the user is not within a threshold distance of the receiver device 120. The receiver device 120 can perform various checks to eliminate false positive and false negative determinations, which will be described in more detail below with reference to FIG. 2.

As the bus 110 begins moving with the user 124 on board, the receiver device 120 can record locations at which the user 124 was on board the bus 110. The receiver device 120 can then associate the determined locations with a user identifier of the user 124.

When the user 124 exits the bus, the strength of the signal 134 emitted by the wireless beacon will wane at the receiver device 120. The receiver device 120 can then determine that the user 124 has exited the bus. At that point or some time later, the receiver device 120 can communicate with a payment service system to provide information about the determined locations at which the user 124 was on board the bus along with a user identifier of the user that was encoded in the signal. The payment service system uses this information to compute a fare owed. The payment service system can then identify an account of the user using the user identifier and process a purchase transaction for the fare using the account of the user.

Figure 2:
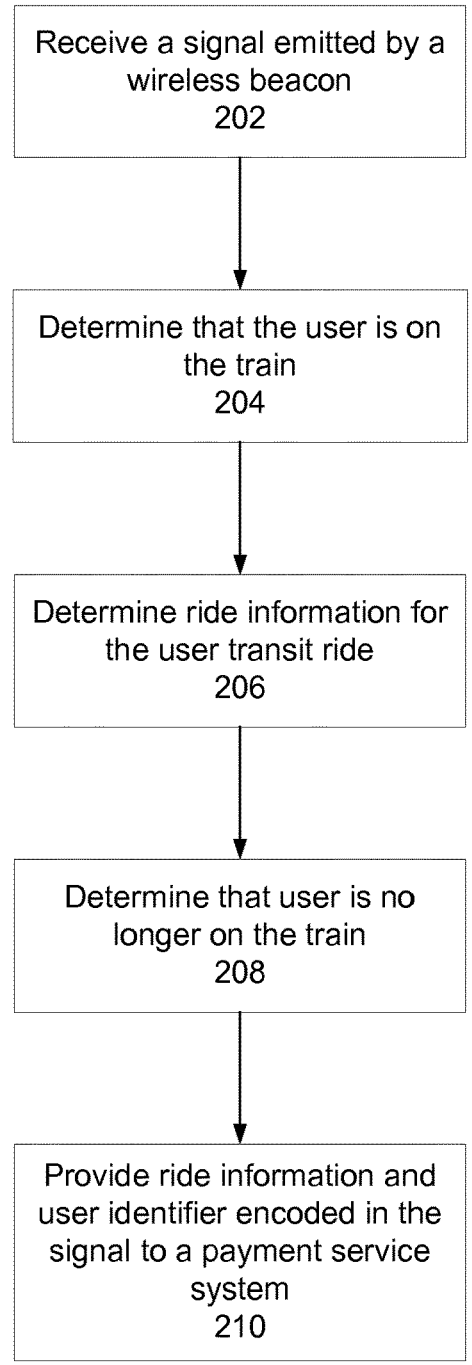
FIG. 2 is a flow chart of an example process for determining location information of a user riding a train.

FIG. 2 is a flow chart of an example process for determining ride information for a user riding a train. In general, a receiver on the train can determine that a user is on board and can generate ride information that describes the transit ride by a user. The ride information can represent locations and times at which a user was determined to be on board the train. Although the example process refers to a user riding a train, the process is equally applicable to any appropriate passenger transport vehicle. The process can be implemented by one or more computer programs installed on one or more computing devices. The process will be described as being performed by a receiver device installed on a train, e.g. the receiver device 120 of FIG. 1.

The receiver receives a signal emitted by a wireless beacon (202). The signal will generally encode a user identifier that can be used by the receiver to distinguish one user from another. The user identifier can also be used by a payment service to identify a user account of the user.

Each wireless beacon may have a permanent, globally unique user identifier, which may be issued by the payment service system or another system. For example, a server of the payment service can communicate with a mobile device of the user to provide a unique user identifier to be used by a wireless beacon embedded in the mobile device.

To protect user privacy, the payment service system can issue user identifiers that do not contain personally-identifying information of the user. Rather, the payment service system issues randomly or pseudorandomly generated user identifiers, e.g., a unique and random string of characters. Thus, neither the receiver nor other nearby devices that are also receiving the wireless signal can use the user identifier to obtain any information about the user.

For increased security and user privacy, the payment service system can issue rotating user identifiers. In other words, the payment service system can repeatedly change the issued user identifier so that a single user device may emit multiple different user identifiers at different times. The receiver may thus be recording multiple user identifiers that actually identify a single user from the perspective of the payment service system.

The receiver can maintain information for a number of user identifiers that have been received from nearby wireless beacons. The receiver may discard user identifiers and associated information after some period of time, e.g., after a day or a week since last receiving a signal that encodes a user identifier.

The receiver determines that the user is on board the train (204). In general, the receiver can analyze one or more on-board criteria to determine that user is on board the train. For example, the receiver can determine that the user is on board the train if the user is close enough to the receiver, e.g., within a threshold distance to the receiver. The receiver can determine a distance to a wireless beacon that is emitting the signal using a measurement of radio signal strength, e.g. a received signal strength indicator (RSSI), decibels, or a signal to noise ratio, to name just a few examples.

In general, the receiver can convert between a measurement of signal strength and a distance using conventional techniques. In some implementations, the receiver computes a distance d based on an RSSI value of the wireless beacon according to:

$$d = A^{-\frac{RSSI+B}{C}},$$

where A, B, and C are empirically chosen constants.

To eliminate false positive determinations, e.g., from wireless beacons of users standing near the receiver but outside the train, the receiver may determine that the user is on board the train only after the train has moved a particular distance, e.g., 100 meters, and after making a second positive determination that the user is within the threshold distance, based on the measurement of signal strength of the wireless beacon.

The receiver can also compare the first computed distance to the second computed distance. If the difference between the first and second computed distances is large, it is likely that the user is not actually on the train. Thus, if the receiver determines that the difference in the distances satisfies a threshold, the receiver can determine that the user is not on the train.

The receiver can also perform a check for whether the measured signal strength of a user drops or remains relatively steady when the train begins moving. Users who are actually on board the train are likely to be associated with relatively steady wireless beacon signal strengths, while users who are not actually on board the train are likely to be associated with wireless beacon signal strengths that drop when the train moves. In some implementations, the receiver computes a measure of the drop in signal strength when the train begins moving. If the drop in signal strength satisfies a threshold, the receiver determines that the associated user is not on board the train.

The receiver determines ride information for the user transit ride (206). The ride information can include location information about locations at which the user was determined to be present on the train. For example, the receiver can repeatedly determine its own location by using an embedded or external global positioning system (GPS) device or other geolocation signals. The receiver can also receive geolocation signals from nearby user devices or fixed beacons located along the train route or in stations. The location information can be in the form of geographic coordinates, e.g., a latitude and a longitude. The location information can also represent transit stations, transit zones, or other enumerated locations that were reached along the route.

The signal emitted by the wireless beacon may also encode geolocation information. For example, a smartphone of a user may use GPS signals to determine its own location and then provide the determined location information to the receiver by encoding it into the wireless beacon signal.

The receiver can then record each location at which the receiver determined that the user was still on the train. For example, the receiver can record the following information that represents train stations at which the user was still on board the train: "Central Street, Market Street, King Street, Howard Street."

The receiver may also record ride information describing times that the user was still on the train. For example, the receiver may record that the user was on the train at times 10:30, 10:34, and 10:38.

The receiver may also determine locations from times that the user was still on the train according to a train schedule that associates times with locations. For example, the receiver can consult a stored train schedule to determine locations at which the user was still on the train at 10:30, 10:34, and 10:38, e.g., Central Street, Market Street, and King Street. The receiver may also determine locations from a start location and an end location. For example, if the receiver determines that the user boarded at Central Street and exited at King Street, the receiver may also determine that the user was on board at Market Street.

In some implementations, the receiver records updates the ride information shortly after the train starts moving after a stop. This can both reduce the number of locations that are stored and can eliminate false positives as described above.

The receiver can associate the determined locations and times with the user identifier encoded in the wireless beacon signal. For example, the receiver can maintain a list of location information for each user identifier encoded in received wireless beacon signals.

The receiver determines that the user is no longer on the train (208). In general, the receiver can analyze one or more exit criteria to determine that user is no longer on board the train. For example, the receiver can determine that one or more of the above-mentioned on-board criteria for whether the user is on the train is not satisfied. For example, if the receiver determines that the signal emitted by the user device fades after the train moves, the receiver can determine that the user is no longer on the train.

To prevent false negatives, the receiver may require multiple determinations that the user is no longer on the train. The receiver may also require a minimum length of time, e.g., 20 minutes, between determinations that the user is no longer on the train, with no intervening determinations that the user is still on the train.

The receiver provides ride information and an associated user identifier to a payment service system (210). The ride information can include locations to which the passenger transport vehicle traveled while the user was determined to be present on the passenger transport vehicle, times at which the user was determined to be present on the passenger transport vehicle, or both. The receiver can communicate with a payment service system using any appropriate communications mechanism, e.g., over the Internet.

The receiver can send the ride information to the payment service system due to a number of triggering criteria. For example, the receiver can send ride information for a particular user identifier after determining that the user is no longer on the train, e.g. after failing to receive a signal for the user identifier after a particular period of time. The receiver can also send ride information to the payment service system after each new location is determined.

The receiver can also buffer the ride information and send the ride information to the payment service system in a bundle. For example, the receiver can transmit a message to the payment service system that includes ride information for multiple user identifiers.

The receiver can also send stored ride information on a periodic basis, e.g. daily or weekly. The receiver can also send stored ride information after being connected to a particular Wi-Fi or wired network, which can occur, for example, after the train reaches a station at the end of the day.

Wireless data communication may be unavailable in some areas to which the train travels. Thus, the receiver can store the ride information and associated user identifiers and send the ride information to the payment service system when wireless data communication again becomes available.

Figure 3:
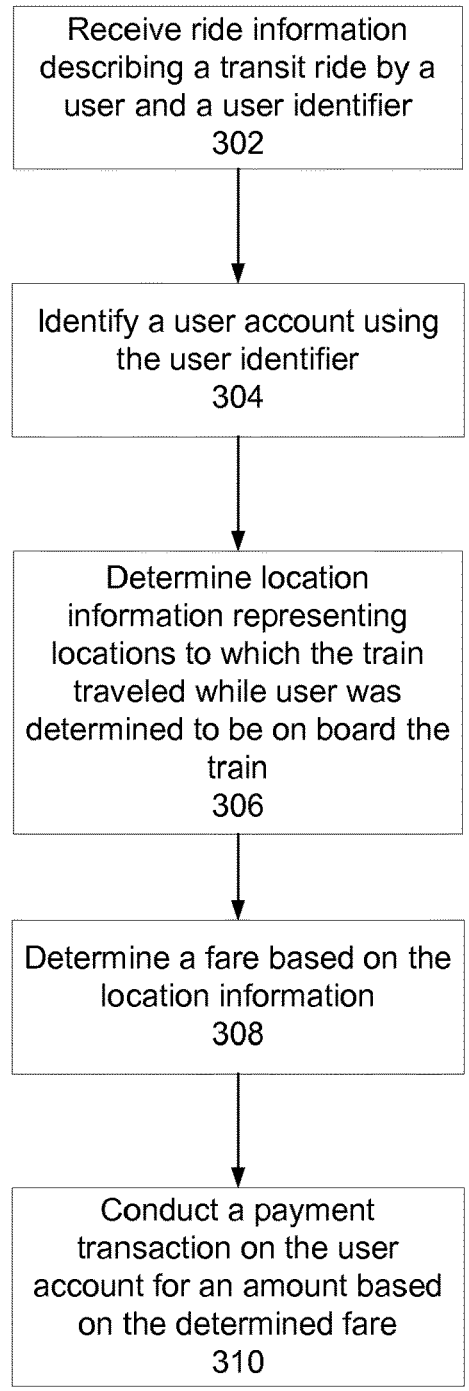
FIG. 3 is a flow chart of an example process for processing fare payment transactions.

FIG. 3 is a flow chart of an example process for processing fare payment transactions. In general, a payment service system receives ride information and an associated user identifier. The ride information describes a transit ride by a user and can represent locations and times at which a user was determined to be on board a train, as determined by signals received by a receiver device on board the train from a wireless beacon in possession of the user. Although the example process refers to a user riding a train, the process is equally applicable to applications on any appropriate passenger transport vehicle. The example process can be implemented by one or more computer programs installed on one or more computers. The process will be described as being performed by a system of one or more computers, e.g. the payment service system 508 of FIG. 5.

The system receives ride information describing a transit ride by a user and a user identifier (302). The system can receive the ride information from a receiver device that is installed on or transported by a passenger transport vehicle.

The system identifies a user account using the user identifier (304). The system can look up the user account by using the user identifier as a key to a mapping between user identifiers and users of the system. If the system issues user identifiers to users, the system can determine a user account that was associated with the user identifier when the user identifier was issued by the system.

Because a payment service system may issue rotating user identifiers, the system may assemble an aggregate collection of ride information that refers to the same user. In other words, multiple segments of ride information associated with multiple user identifiers can refer to the same user account. To account for possible delays in receiving communicated ride information, the system may wait some period of time, e.g., two days or a week, before processing payment transactions in order to increase the likelihood that all relevant ride information for a particular user has been received.

The system determines location information representing locations to which the train traveled while the user was determined to be on board the train (306). The ride information can include location information that represents locations to which the train traveled while the user was on board. As described above, the location information can represent geographic coordinates, transit stations, transit zones, or other landmarks, e.g., streets traveled on or crossed.

The ride information may also include a list of times that the user was determined to be present on the passenger transport vehicle. The system can determine locations to which the train traveled while the user was on board by using a stored train schedule that associates times with locations.

The system determines a fare based on the location information (308). For example, the system can use the location information to determine relevant information for computing a fare, e.g., a service line taken, a route, a distance traveled, or locations or zones visited. The system may also consider transfers taken by the user when determining the fare, taking into account local transfer rules, e.g., one free train-to-bus transfer.

The fare calculation will generally be set by authorities of a particular transit system. Thus, the system can receive fare calculation information from a computer system of a transit system authority in order to determine the fares. The system can also provide the received ride information directly to the transit system authority and can receive a fare computed by the transit system authority as a response.

In some implementations, the fare calculation is divided between the payment service system and the receiver device on board the passenger transport vehicle. For example, the receiver device can compute a partial fare for the portion of the journey that that the user was on board the passenger transport vehicle and can provide the partial fare calculation to the payment service system. The payment service system can then compute a total fare for the user. The total fare calculation may be based on information assembled from multiple user identifiers, e.g., multiple rotating user identifiers or multiple user identifiers received from multiple receiver devices on other passenger transport vehicles ridden by the user.

The system conducts a payment transaction on the user account for an amount based on the determined fare (310). For example, the system can obtain payment card information from the user account and can use the payment card information to process a purchase transaction for the fare amount, e.g., by charging the fare amount to the payment card and crediting an account associated with the transit authority. The system may also use funds associated with the user account to process the purchase transaction. The system may also process the transaction according to incentives authorized by the transit authority, e.g., 10% off, in order to encourage more users to use wireless beacons.

The system may process a purchase transaction as soon as the fare is determined. The system may also periodically process a single purchase transaction for all determined fares within a particular time period, e.g., within the last week. In some implementations, the system may ask a user to pre-authorize a particular amount of funds for purchase transactions. The system may then occasionally reauthorize a particular amount of funds as they are consumed by transit rides.

After processing the purchase transaction, the system may provide an electronic receipt to the user, e.g., by sending an email or text message to the user.

Figure 4:
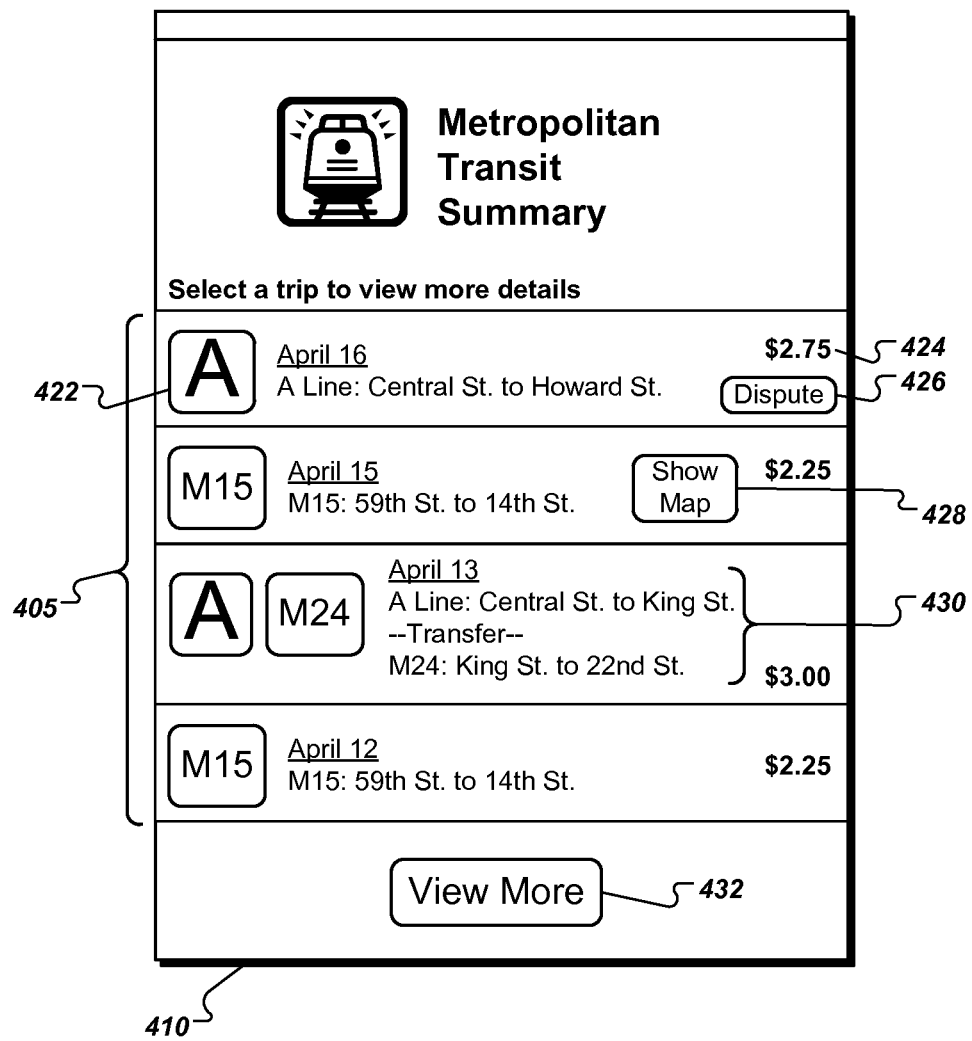
FIG. 4 illustrates an example user interface that provides information on transit activity.

FIG. 4 illustrates an example user interface 410 that provides information on transit activity. The user interface 410 can for example be a presentation in a web browser navigated to a web site maintained by the payment service system or can be part of a user application installed on a user device. For example, a user can access the user interface 410 by logging in to the payment service system to see a report of recent transit activity.

The user interface 410 includes a number of entries 405 that provide information on transit activity. For example, an entry can include a line or route icon 422 that identifies the transit service lines taken. Each entry can also include a fare charged 424 and a dispute button 426 for notifying the system of a possible error.

Each entry includes a description 430 that summarizes the route taken, including any transfers along the route. Each entry may also include a map button 428 that, when selected, shows the route taken overlaid on an interactive map. The interface also includes a button 432 for retrieving more transit activity.

Figure 5:
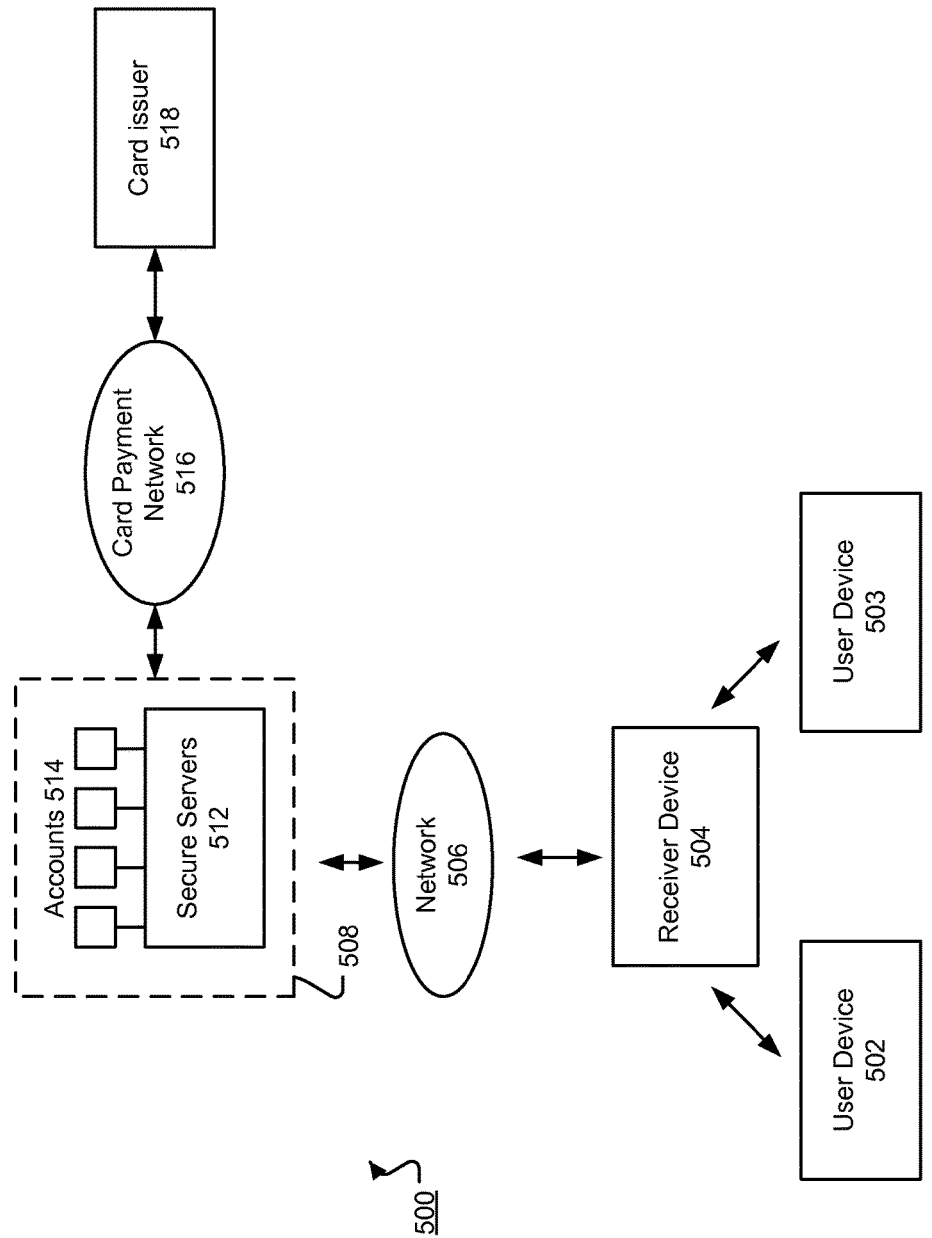
FIG. 5 is a schematic illustration of the architecture of an example system.

FIG. 5 is a schematic illustration of the architecture of an example system 500. The overall system 500 includes two user devices 502 and 503, a receiver device 504, and a payment service system 508 connected to a network 506, e.g., the Internet. The user devices 502 and 503 are computing devices capable of emitting wireless signals. For example, the user device 502 can be a BLE-enabled smartphone or tablet computer, and the user device 503 can be a dedicated BLE beacon.

The receiver device 504 is also a computing device that can be placed on a passenger transport vehicle of a transit system. The receiver device 504 can determine when users get on and get off the passenger transport vehicle and can provide ride information that represents locations at which the users were on board to the payment service system 508. The payment service system 508 can then process payment transactions for the appropriate transit system fares on behalf of the users associated with the user devices 502 and 503.

The receiver device 504 can communicate with the payment service system 508 using the network 506. The network 506 can be a wireless cellular network, a wireless local area network, a Wi-Fi network, a mobile telephone or another telecommunications network, a wired Ethernet network, a private network such as an intranet, a public network such as the Internet, or any appropriate combination of such networks.

Optionally, the user devices 502, 503 can also communicate with the payment service system 508 using the network 506. In addition, receiver device 504 and the user devices 502, 503 can communicate directly with one another using a variety of communication technologies, e.g. near field communication (NFC), Bluetooth, or Bluetooth Low Energy (BLE) technologies.

The payment service system 508 includes one or more servers 512, at least some of which can handle secure transactions, e.g., a secure server, to processes all transactions between the user devices 502, 503 and the receiver device 504. In general, the servers 512 can receive fare calculation information from transit authorities and compute fares from location information received from the receiver device 504. The servers 512 can also be responsible for transferring or updating the user application to the user's mobile device or transferring or updating the merchant application to the merchant's computing device. The servers 512 also handle secure information such as credit card numbers, debit card numbers, bank accounts, user accounts, user identifying information or other sensitive information.

The payment service system 508 can communicate electronically with a card payment network 516, e.g., Visa, Mastercard, or the like. The payment service system 508 can communicate with a computer system 516 of a card payment network, e.g., Visa or MasterCard. The payment service system 508 can communicate with a computer system 516 over the same network 506 used to communicate with the user devices 502, 503 or over a different network. The computer system 516 of the card payment network can communicate in turn with a computer system 518 of a card issuer, e.g., a bank. There can also be computer systems of other entities, e.g., the card acquirer, between the payment service system 508 and the card issuer.

Before the user can use a wireless beacon for transit systems, the user creates a user account with the payment service system 508 and registers the wireless beacon with the payment service system.

The user can create an account using a mobile application or using an online website, and can use a mobile device or another computing device, e.g., a home computer. At some point prior to the transaction, a user application is downloaded to the user devices 502, 503 e.g., through an application store. Creation of the user account can be handled through the user application, or through another application, e.g., a generic web browser. The user enters a name, account password, and contact information, e.g., email address. Before a transaction can be performed, the user also enters financial account information sufficient to conduct the transaction into the payment service system 508. For example, in the case of a credit card account, the user can enter the credit card issuer, credit card number and expiration date into the payment service system 508; the card validation value and mailing address may also be required. However, the financial account could also be associated with a debit card or pre-paid card, or another third party financial account.

A transit system user authorized to act on behalf of a transit system associated with the receiver device 504 can also sign up the transit system for an account with the payment service system 508. The transit system user enters a name, account password, and contact information, e.g., email address, and physical location information, e.g., an address, of the transit system into the payment service system 508. The transit system user can also provide fare calculation information for calculating fares from geographic location information that represents routes traveled by users. The transit system user can also provide other information about the transit system, e.g., operating hours, a phone number, a small identifying image logo or mark, to the payment service system 508. The data associated with the transit system account 514 can be stored at the servers 512, e.g., in a database.

At some point prior to operation, the receiver device 504 installs a transit application, e.g., through an application store. Creation of the transit system account can be handled through the transit application, or through another application, e.g., a generic web browser.

Eventually, in order to receive funds from the transaction, the transit system user will need to enter financial account information into the payment service system 508 sufficient to receive funds. For example, in the case of a bank account, the transit system user can enter the bank account number and routing number. However, the transit system's financial account can also be associated with a credit card account or another third party financial account. In addition, in some implementations, if the transit system user has not entered the financial account information, the cardless payment processor can hold the received funds until the financial account information is provided.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, from a receiver device on a passenger transport vehicle, a user identifier and ride information describing a transit ride by a user while the user is determined to be present on the passenger transport vehicle, the user identifier provided to the receiver by a wireless electronic device carried by the user upon establishing a wireless connection with the receiver device, the ride information being indicative of at least a first location at which the receiver device established the wireless connection with the wireless electronic device;
periodically sending at least one identifier to the wireless electronic device;
maintaining a record associating the at least one identifier with the wireless electronic device;
determining, using the record, whether the user is on-board the passenger transport vehicle based at least in part on (1) a first signal strength between the receiver and the wireless electronic device carried by the user at the first location, (2) a second signal strength between the receiver and the wireless electronic device carried by the user after the passenger transport vehicle has moved a threshold distance from the first location and before arriving at a second location at which the receiver device ended a wireless communication with the wireless electronic device, and (3) comparing a drop in signal strength between the first signal strength and the second signal strength to a threshold;
upon determining that the user in on-board the passenger transport vehicle, determining a fare based on the first location and the second location;
identifying a user account of a payment service system based on the user identifier; and
initiating a payment transaction to charge the user account for an amount based on the determined fare.

2. The computer-implemented method of claim 1, wherein
the ride information includes a plurality of times that the user is determined to be present on the passenger transport vehicle, and
the computer-implemented method further comprises determining, from the ride information and a schedule that associates times with respective locations, a plurality of locations to which a passenger transport vehicle traveled while the user is determined to be present on the passenger transport vehicle.

3. The computer-implemented method of claim 1, wherein each of the first location and the second location comprises geographic coordinates.

4. The computer-implemented method of claim 1, wherein each of the first location and the second location comprises a landmark identifier or a station identifier.

5. The computer-implemented method of claim 1, wherein
determining a fare based on the first location and the second location comprises:
determining a distance traveled based on the first location and the second location; and
determining a fare based on the distance traveled.

6. The computer-implemented method of claim 1, wherein determining a fare based on the first location and the second location comprises:
receiving fare calculation information from a transit system authority; and
computing the fare based on the first location, the second location and the fare calculation information.

7. The computer-implemented method of claim 1, wherein the user is determined to be on-board the passenger transportation vehicle when the drop in signal strength between the first signal strength and the second signal strength is less than the threshold.

8. The computer-implemented method of claim 1, wherein a user is determined to be off-board the passenger transportation vehicle at the second location when a drop in signal strength between the second signal strength and a third signal strength measured at the second location is greater than the threshold.

9. The computer-implemented method of claim 1, further comprising:
assigning multiple identifiers to the wireless electronic device; and
periodically sending a different one of the multiple identifiers to the wireless electronic device; wherein the record associates the multiple identifiers with the wireless electronic device, wherein every time the user identifier is received from the receiver device between a first time at which the passenger transport vehicle is at the first location and a second time at which the passenger transport vehicle is at the second location, the received user identifier is a different one of the multiple identifiers.

10. A server comprising:
memory having computer-readable instructions stored therein; and
one or more processors configured to execute the computer-readable instructions to:
receive, from a receiver device on a passenger transport vehicle, a user identifier and ride information describing a transit ride by a user while the user is determined to be present on the passenger transport vehicle, the user identifier provided to the receiver by a wireless electronic device carried by the user upon establishing a wireless connection with the receiver device, the ride information being indicative of at least a first location at which the receiver device established the wireless connection with the wireless electronic device;
periodically send at least one identifier to the wireless electronic device;
maintain a record associating the at least one identifier with the wireless electronic device;
determine, using the record, whether the user is on-board the passenger transport vehicle based at least in part on (1) a first signal strength between the receiver and the wireless electronic device carried by the user at the first location, (2) a second signal strength between the receiver and the wireless electronic device carried by the user after the passenger transport vehicle has moved a threshold distance from the first location and before arriving at a second location at which the receiver device ended a wireless communication with the wireless electronic device, and (3) comparing a drop in signal strength between the first signal strength and the second signal strength to a threshold;

upon determining that the user in on-board the passenger transport vehicle, determine a fare based on the first location and the second location;

identify a user account of a payment service system based on the user identifier; and initiate a payment transaction to charge the user account for an amount based on the determined fare.

11. The device of claim 10, wherein the ride information includes a plurality of times that the user is determined to be present on the passenger transport vehicle, and the one or more processors are configured to determine, from the ride information and a schedule that associates times with respective locations, a plurality of locations to which a passenger transport vehicle traveled while the user is determined to be present on the passenger transport vehicle.

12. The device of claim 10, wherein each of the first location and the second location comprises geographic coordinates.

13. The device of claim 10, wherein each of the first location and the second location comprises a landmark identifier or a station identifier.

14. The device of claim 10, wherein the one or more processors are configured to determine a fare based on the first location and the second location by:

determining a distance traveled based on the first location and the second location; and determining a fare based on the distance traveled.

15. The device of claim 10, wherein one or more processors are configured to determine a fare based on the first location and the second location by:

receiving fare calculation information from a transit system authority; and computing the fare based on the first location, the second location and the fare calculation information.

16. The device of claim 10, wherein the user is determined to be on-board the passenger transportation vehicle when the drop in signal strength between the first signal strength and the second signal strength is less than the threshold.

17. The device of claim 10, wherein the user is determined to be off-board the passenger transportation vehicle at the second location when a drop in signal strength between the second signal strength and a third signal strength measured at the second location is greater than the threshold.

18. The device of claim 10, wherein the one or more processors are configured to execute the computer-readable instructions to:

assign multiple identifiers to the wireless electronic device; and periodically send a different one of the multiple identifiers to the wireless electronic device; wherein the record associates the multiple identifiers with the wireless electronic device, wherein every time the device receives the user identifier from the receiver device between a first time at which the passenger transport vehicle is at the first location and a second time at which the passenger transport vehicle is at the second location, the received user identifier is a different one of the multiple identifiers.

* * * * *